United States Patent [19]

Matsuo et al.

[11] Patent Number: 4,485,213

[45] Date of Patent: Nov. 27, 1984

[54] PROCESS FOR THE PRODUCTION OF HIGH IMPACT BLOCK COPOLYAMIDE

[75] Inventors: Tadao Matsuo; Shuji Mori, both of Hyogo; Kenzo Tanaka, Aichi, all of Japan

[73] Assignee: Mitsuboshi Belting Ltd., Hyogo, Japan

[21] Appl. No.: 479,237

[22] Filed: Mar. 28, 1983

[30] Foreign Application Priority Data

Mar. 27, 1982 [JP] Japan ................................ 57-49326

[51] Int. Cl.$^3$ ........................ C08F 8/30; C08L 77/00; C08L 35/00
[52] U.S. Cl. .................................. 525/123; 525/183; 525/184
[58] Field of Search ........................ 525/123, 183, 184

[56] References Cited

U.S. PATENT DOCUMENTS

| | | | |
|---|---|---|---|
| 2,877,212 | 3/1959 | Seligman | 525/123 |
| 3,859,382 | 1/1975 | Hergenrother | 525/123 |
| 3,887,643 | 6/1975 | Selman | 525/123 |
| 4,070,344 | 1/1978 | Hergenrither | 525/123 |
| 4,151,222 | 4/1979 | Hergenrother | 525/184 |

FOREIGN PATENT DOCUMENTS

| | | | |
|---|---|---|---|
| 139337 | 12/1979 | German Democratic Rep. | 525/123 |
| 57-57720 | 4/1982 | Japan | 525/184 |
| 1169737 | 11/1969 | United Kingdom | 525/184 |

*Primary Examiner*—Melvyn I. Marquis
*Assistant Examiner*—A. L. Carrillo
*Attorney, Agent, or Firm*—Sughrue, Mion, Zinn, Macpeak & Seas

[57] ABSTRACT

A process for producing high impact block copolyamide is described, comprising anion polymerizing ω-lactam in the presence of a prepolymer polymerization accelerator. The prepolymer is prepared by reacting a butadiene homopolymer and/or butadiene-acrylonitrile copolymer containing hydroxyl groups at the terminals thereof with polymethylene polyphenylene isocyanate or tolylene diisocyanate at an equivalent ratio of isocyanate group to hydroxyl group (NCO/OH) of 1:1 or more. With the thus-produced high impact block copolyamide, impact strength is greatly improved, and bleeding of polybutadiene is not observed.

5 Claims, No Drawings

PROCESS FOR THE PRODUCTION OF HIGH IMPACT BLOCK COPOLYAMIDE

FIELD OF THE INVENTION

The present invention relates to a process for the production of block copolyamide having high impact resistance.

BACKGROUND OF THE INVENTION

An alkali polymerization process of ω-lactam in which the ω-lactam is polymerized by heating in the presence of a strong alkali catalyst and a polymerization accelerator is known. Polyamide produced by the alkali polymerization process has advantages over those polyamides produced by polymerizing ω-lactam in the presence of water in that the tensile strength and flexural strength are great, the water absorption is low, and the heat distortion temperature is high. However, it is not desirable because its elongation is small and impact strength low. Thus, several attempts have been made to improve the disadvantages of low impact strength and small elongation while making the best use of the advantages of the alkali polymerization process.

For example, a method of copolymerizing ε-caprolactam with ω-laurinlactam (see Japanese Pat. Publication No. 13754/68), a method of copolymerizing ε-caprolactam with ω-laurinlactam or ω-caprinlactam in the presence of N-alkylpyrrolidone (see Japanese Pat. Publication No. 22388/72), a method of polymerizing ω-lactam in the presence of high molecular weight polyalkylene glycol (see Japanese Patent Application (OPI) No. 72394/74 (corresponding to German Patent Application (OLS) No. 2,248,664) (the term "OPI" as used herein refers to a "published unexamined Japanese patent application"), a method of polymerizing ω-lactam in the presence of polybutadiene having hydroxyl groups at the main chain teminals (see Japanese Patent Publication No. 15319/77), and a method of polymerizing ω-lactam in the presence of N-alkylpyrrolidone and at least one compound of liquid polyolefin, polypropylene glycol, and silicone oil which are compatible with the N-alkylpyrrolidone (see Japanese Patent Publication No. 39244/80) have been proposed.

However, these methods except the one disclosed in Japanese Patent Publication No. 15319/77 in which ω-lactam is polymerized in the presence of polybutadiene containing hydroxyl groups at the terminals of the main chain thereof can produce only those polyamides having an impact strength (Izod impact strength) of at most about 10 kg·cm/cm. Thus, it cannot be said that the methods have succeeded in improving the impact strength.

On the other hand, the method disclosed in Japanese Patent Publication No. 15319/77 has received attention as a method of greatly improving Izod impact strength. In accordance with this method, however, a sufficient amount of polybutadiene to improve impact strength is added by the one shot process and, therefore, unreacted polybutadiene remains, causing various problems; e.g., the unreacted polybutadiene comes out onto the surface of the polyamide (bleeding), and the surface of the polyamide is very tacky and has a bad appearance. In some cases, the bleeding occurs during the polymerization. Thus, it cammot be said that the method disclosed in Japanese Patent Publication No. 15319/77 is sufficiently satisfactory for practical use.

SUMMARY OF THE INVENTION

An object of the invention is to provide polyamide which is greatly improved in impact strength.

Another object of the invention is to provide polyamide which is free from the problem of bleeding of additives and has a good surface condition.

Other objects and features of the invention will become apparent from the following detailed description The present invention relates to a process for producing high impact block copolyamide which comprises anion polymerizing at least one type of ω-lactam in the presence as a polymerization accelerator of a prepolymer obtained by previously reacting a butadiene homopolymer and/or a butadiene-acrylonitrile copolymer, said homopolymer and copolymer containing hydroxyl groups at both terminals thereof, with polymethylene polyphenylene isocyanate or tolylenediisocyanate at an equivalent ratio of isocyanate group to hydroxyl group (NCO/OH) of 1:1 or more.

DETAILED DESCRIPTION OF THE INVENTION

According to the present invention, it has been found that of a wide variety of isocyanates, polymethylene polyphenyleneisocyanate or tolylenediisocyanate can improve impact resistance when used as a component of the prepolymer polymerization accelerator. The reason for this is believed to be that the isocyanates used herein disturb the crystallization of polyamides because they do not have a rigid molecular structure compared with 4,4'-diphenylmethane diisocyanate, carboxyimidomodified 4,4'-diphenylmethane diisocyanate, and the like.

Moreover, in accordance with the present invention, the butadiene homopolymer or butadiene-acrylonitrile copolymer is previously reacted with the isocyanate to form a prepolymer and used as one component of the prepolymer. This is different from the one shot process in which all components are added together with ω-lactam and polymerized. Thus, the present invention is desirable in that the polybutadiene is not liberated and does not come out to the surface of polyamide, i.e., bleeding of the polybutadiene does not occur.

The butadiene homopolymers containing hydroxyl groups at both terminals thereof which can be used in the process of the present invention are such that the molecular skeleton is polybutadiene and both terminals have an allyl type primary hydroxy group having an excellent reactivity, and are commercially available products such as Polybd R-45HT and Polybd R-45M (trade names for the products produced by Idemitsu Petrochemical Co., Ltd.), NISSO-PBG-1000, 2000, and 3000 (trade names for the products produced by Nippon Soda Co., Ltd.), Poly B-D Liquid Resins R-15M (trade name for the product produced by Sinclair Petrochemicals, Inc.), or the like. The specific and preferred examples thereof are Polybd R-45HT and R-45M represented by the formula

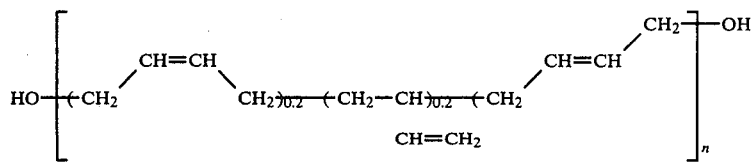

wherein trans-1,4 structure is 60%, cis-1,4 structure is 20%, vinyl-1,2 structure is 20%, the average molecular weight is 3,000 to 4,000, and n is 50 to 55.

The butadiene-acrylonitrile copolymers containing hydroxyl groups at the both terminals thereof are such that both terminals have an allyl type primary hydroxy group having an excellent reactivity, and are commercially available. The specific and preferred example thereof is Polybd CN-15 (trade name for the product produced by Idemitsu Petrochemical Co., Ltd.) represented by the formula

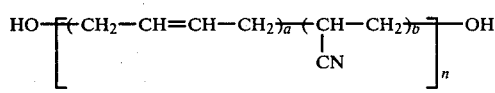

wherein a is 0.85, b is 0.15, n is 78 to 87, and the average molecular weight is 3,000 to 4,000.

The butadiene homopolymer and/or butadiene-acrylonitrile copolymer is reacted with the isocyanate and added as one component of the resulting prepolymer polymerization accelerator. The isocyanates that can be used in the invention are critical and are polymethylene polyphenylene isocyanate and tolylene diisocyanate.

The polymethylene polyphenylene isocyanate is polyisocyanate represented by the formula:

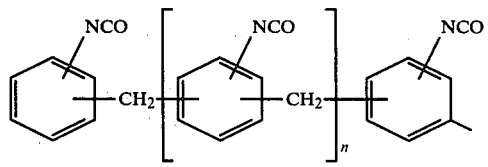

wherein n is 0.1 to 0.9.

Examples are PAPI (trade name for the product produced by Kasei Abjon Co., Ltd.) and Sumijule 44V (trade name for the product produced by Sumitomo Bayer Urethane Co., Ltd.).

The tolylene diisocyanate is a 2,4-isomer represented by the formula:

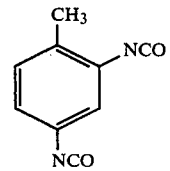

(2,4-isomer)

In addition, mixtures of 2,4-isomer and 2,6-isomer having the formula as illustrated below, e.g., a 80/20 mixture and a 65/35 mixture, can be used.

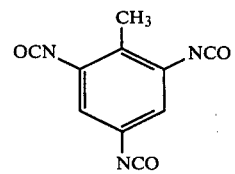

(2,6-isomer)

Examples are TDI 80/20, 65/35 (trade names for the products produced by Mitsubishi Kasei Indusrtry Co., Ltd.), and Sumijule T-80 (trade name for the product produced by Sumitomo Bayer Urethane Co., Ltd.).

The isocyanate and butadiene homopolymer or butadiene-acrylonitrile copolymer are reacted after combining the reactants in an equivalent ratio of isocyanate groups to hydroxyl groups (NCO/OH) of 1:1 or more, preferably from 1.5:1 to 10:1, most preferably 2:1 to 5:1. The reaction is generally carried out while stirring the reactants at from room temperature to 100° C. for from 1 to 2 hours.

Some of such prepolymers are commercially available. The preparation of the prepolymers is conventional, and the reaction temperature and reaction time is not particularly significant but the equivalent ration of NCO/OH is important. Examples are Polybd HTP-9PA, HTP-4, 9 (trade names for the products manufactured by Idemitsu Petrochemical Co., Ltd.).

Polybd HTP-4 and HTP-9 are represented by the formula:

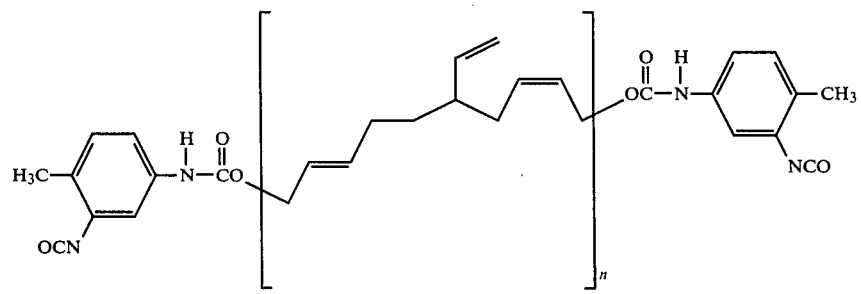

wherein n is 50 to 55 and Polybd HTP-9PA is represented by the formula:

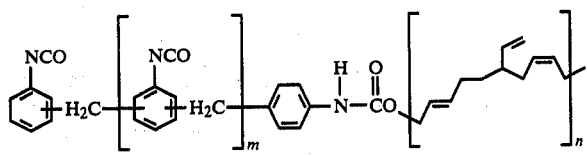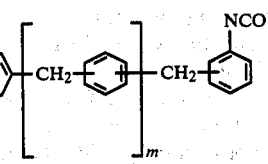

wherein m is the average value of about 0.1 to 0.9, and n is 50 to 55.

Those prepolymers contain 2 to 15% by weight, preferably 3 to 10% by weight, of free isocyanates.

In order to obtain the desired impact strength, it is preferred to add the above-prepared prepolymer polymerization accelerator in an amount of from 2 to 30% by weight, preferably 10 to 25% by weight, most preferably 15 to 20% by weight, based on the weight of ω-lactam.

The prepolymer polymerization accelerator can be added to the ω-lactam polymerization system in any suitable manner. In order to achieve uniform dispersion in a short period of time, it is most preferred that a solution prepared by mixing a ω-lactam melted solution and the polymerization accelerator is mixed with a solution prepared by reaction melting the anion polymerization catalyst in the ω-lactam melted solution.

The term "ω-lactam" as used herein refers to substantially anhydrous 5-membered or higher ring ω-lactams, including 2-pyrrolidone, 2-piperidone, ε-caprolactam, ω-enantholactam, ω-caprylolactam, ω-pelargonolactam, ω-decanolactam, ω-undecanolactam, ω-laurolactam, and mixtures comprising two or more of the ω-lactams. In particular, ε-caprolactam, ω-laurolactam and a mixture of ε-caprolactam and ω-laurolactam are advantageous and suitable for industrial use.

In the anion polymerization of the ω-lactam in the process of the present invention, any known strongly basic compound catalysts can be used, including alkali metals, alkaline earth metals, and hydrides, hydroxides, corbonates, and alkylated products of alkali metals or alkaline earth metals, and reaction products of the above-described compound and ω-lactam.

The amount of the polymerization catalyst added is usually from 0.1 to 10 mole %, preferably 0.1 to 5 mole %, most preferably 1 to 3 mole %, per mole of the ω-lactam.

In accordance with the process of the present invention, at least one ω-lactam is polymerized at a temperature of from not lower than the melting point of the ω-lactam to not higher than the melting point of the resulting polyamide in the presence of an anion polymerization catalyst and a prepolymer polymerization accelerator. The prepolymer is prepared by reacting a polybutadiene-based polyol containing a soft segment, i.e., a butadiene homopolymer or butadiene-acrylonitrile copolymer containing hydroxyl groups at both terminals thereof, with a specific isocyanate not having a rigid molecular structure within the equivalent ratio of isocyanate group to hydroxyl group (NCO/OH) of from 1.5:1 to 10:1. Accordingly, the soft segment is introduced into the polyamide, disturbing the crystallinity of the polyamide. This makes it possible to obtain the polyamide having the desired impact resistance. In this polymerization, various fillers such as glass fiber, wollastonite, carbon filber, titanium dioxide, and calcium carbonate powder may be added. If the amount of fillers added is too large, the viscosity of the system increases, thereby causing difficulty on the operation. Therefore, the fillers are preferably added in an amount of up to 40 parts by weight per 100 parts by weight of the lactam.

The present invention is explained in greater detail by reference to the following Examples and Comparative Examples although the present invention is not limited thereto.

In the examples, Izod impact strength (notched) was measured in the absolutely dried condition according to JIS K-6810.

EXAMPLE 1

To 700 g of substantially anhydrous ε-caprolactam which had been melted by heating was added 280 g of HTP-9PA (polymethylene polyphenylene isocyanate prepolymer of hydroxy group-terminated liquid polybutadiene homopolymer; NCO %: 9%; manufactured by Idemitsu Petrochemical Co., Ltd.), and the mixture was maintained at 120° C.

Separately, 700 g of substantially anhydrous ε-caprolactam was melted by heating, and 7.1 g of sodium hydride (62.1% oily) was added and reaction melted therein. The resulting mixture was maintained at 120° C.

The thus-prepared two solutions were poured into a plate-like mold which had been previously heated to 140° C. They were then mixed and stirred, heated for 1 hour in an oven maintained at 150° C., and taken out of the mold.

The thus-produced block copolyamide did not show any bleeding of polybutadiene, and Izod impact strength (notched) was 27.1 kg·cm/cm.

EXAMPLE 2

Block copolyamide was produced in the same manner as in Example 1 except that HTP-9 (tolylenediisocyanate prepolymer of hydroxy group-terminated liquid polybutadiene homopolymer; NCO %: 9%; manufactured by Idemitsu Petrochemical Co., Ltd.) was used as a polymerization accelerator.

The thus-produced block copolyamide did not show any bleeding of polybutadiene, and the Izod impact strength (notched) was 25.1 kg·cm/cm.

COMPARATIVE EXAMPLE 1

Block copolyamide was produced in the same manner as in Example 1 except that HPT-5MLD (carbodiimidemodified 4,4'-diphenylmethaneisocyanate (MDI) prepolymer of hydroxyl group-terminated liquid polybutadiene homopolymer; NCO %: 4.4%; manufactured by Idemitsu Petrochemical CO., Ltd.) was used as a polymerization accelerator.

The Izod impact strength (notched) of the block copolyamide was 2.6 kg·cm/cm. The block copolyamide did not show any bleeding of polybutadiene.

COMPARATIVE EXAMPLE 2

Polyamide was produced in the same manner as in Example 1 except that 9.3 g of 4,4'-diphenylmethane diisocyanate (pure MDI) (trade name: MILIONATE MT-F; manufactured by Nippon Polyurethane Kogyo Co., Ltd.) was used as a polymerization accelerator.

The Izod impact strength (notched) of the polyamide was 3.0 kg·cm/cm. The block copolyamide did not show any bleeding of polybutadiene.

From the foregoing Examples and Comparative Examples, it can be seen that the process of the present invention provides block copolyamide having very high impact resistance compared with conventional methods. Furthermore, the materials produced have good surface characteristics.

Block copolyamides produced using crude MDI and those produced with pure MDI as a polymerization accelerator possess significantly different impact resistance. This is believed to be due to the fact that the pure MDI has a rigid molecular structure and has only a limited effect of disturbing the crystallization of polyamide.

On the other hand, TDI is suitable for use as one component of the prepolymer to improve impact resistance. The reason for this is believed to be that the molecular structure of TDI produces a greater crystallization-disturbing effect than the pure MDI and modified MDI.

The process of the present invention is believed to be very useful for the production of high impact block copolyamide in view of the improved results obtained, as demonstated above.

While the invention has been described in detail and with reference to specific embodiments thereof, it will be apparent to one skilled in the art that various changes and modifications can be made therein without departing from the spirit and scope thereof.

What is claimed is:

1. A process for producing high impact block copolyamide, comprising the steps of:

reacting a compound selected from the group consisting of a butadiene homopolymer and a butadiene-acrylonitrile copolymer, the homopolymer and copolymer having hydroxyl groups at both terminals thereof, with a compound selected from the group consisting of polymethylene polyphenylene isocyanate and tolylene diisocyanate at an equivalent ratio of cyanate group to hydroxyl group (NCO/OH) of 1:1 or more, in order to produce a prepolymer polymerization accelerator;

carrying out bulk polymerization by providing the prepolymer polymerization accelerator in a reaction vessel with a ω-lactam; and anion polymerizing the ω-lactam in the presence of the accelerator to provide the block copolyamide.

2. A process for producing high impact block copolyamide as claimed in claim 1, wherein the accelerator is provided in the reaction vessel with the ω-lactam in an amount of from 2 to 30% by weight based on the weight of the ω-lactam.

3. A process for producing high impact block copolyamide as claimed in claim 1, wherein the ratio of the cyanate group to hydroxyl group is 1.5:1 to 10:1.

4. A process for producing high impact block copolyamide as claimed in claim 1, wherein the anion polymerizing is carried out at a temperature within the ranger of 20° C. to 100° C. over a period of time of from 1 hour to 2 hours.

5. A process for producing high impact block copolyamide as claimed in claim 1, wherein the anion polymerizing is carried out in the presence of a strongly basic compound catalyst present in an amount within the range of 0.1 to 10 mole % of the ω-lactam.

* * * * *